(12) United States Patent
Dillard et al.

(10) Patent No.: US 10,489,865 B1
(45) Date of Patent: Nov. 26, 2019

(54) FRAMEWORK FOR CASH-FLOW FORECASTING

(71) Applicants: Colin Dillard, Redwood City, CA (US); Siddharth Ram, Menlo Park, CA (US); Shyam P. Nukala, Santa Clara, CA (US); Anup Pramod Mutalik, Mountain View, CA (US)

(72) Inventors: Colin Dillard, Redwood City, CA (US); Siddharth Ram, Menlo Park, CA (US); Shyam P. Nukala, Santa Clara, CA (US); Anup Pramod Mutalik, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 241 days.

(21) Appl. No.: 15/473,535

(22) Filed: Mar. 29, 2017

(51) Int. Cl.
  *G06Q 40/00* (2012.01)
  *G06F 17/14* (2006.01)
  *G06F 17/28* (2006.01)

(52) U.S. Cl.
  CPC ........... *G06Q 40/12* (2013.12); *G06F 17/142* (2013.01); *G06F 17/28* (2013.01)

(58) Field of Classification Search
  CPC ........ G06Q 40/12; G06F 17/142; G06F 17/28
  See application file for complete search history.

(56) References Cited

U.S. PATENT DOCUMENTS

| | | | |
|---|---|---|---|
| 8,204,809 B1 * | 6/2012 | Wise ...................... | G06Q 40/06 705/35 |
| 9,965,808 B1 * | 5/2018 | Kunz ..................... | G06Q 40/12 |
| 2002/0174006 A1 * | 11/2002 | Rugge ................... | G06Q 10/10 705/36 R |
| 2006/0047588 A1 * | 3/2006 | Lal ........................ | G06Q 40/02 705/30 |
| 2013/0085913 A1 * | 4/2013 | Luongo ................ | G06Q 20/207 705/31 |
| 2014/0258063 A1 * | 9/2014 | Chourasia .............. | G06Q 40/00 705/35 |

(Continued)

OTHER PUBLICATIONS

Synechron "USE CASE Automated Data Extraction", Mar. 27, 2017 (Year: 2017).*

(Continued)

*Primary Examiner* — Florian M Zeender
*Assistant Examiner* — Vanessa Deligi
(74) *Attorney, Agent, or Firm* — Ferguson Braswell Fraser Kubasta PC (57) ABSTRACT

A method for cash forecasting creates a plurality of event streams associated with a user of an online accounting service, identifies a first pattern in a first event stream that is a commitment and a second pattern in a second event stream that is a repeated pattern, generates a characterization for each of the plurality of event streams based on each identified pattern for the event stream, predicts one or more expected cash payments and one or more corresponding expected dates for each of the event streams using the characterization for the event stream and a forecasting model, receives a query related to cash flow through an application program interface (API), and responds to the query based on the one or more of the expected cash payments, the corresponding expected dates, and the one or more measures of uncertainty, to the query.

21 Claims, 6 Drawing Sheets

(56) References Cited

U.S. PATENT DOCUMENTS

2017/0039553 A1* 2/2017 Ghatage ............. G06Q 20/3563
2017/0337489 A1* 11/2017 Porter ................. G06Q 10/067
2018/0040064 A1* 2/2018 Grigg .................... G06N 5/022
2018/0158146 A1* 6/2018 Turner .................. G06Q 40/02
2018/0285982 A1* 10/2018 Pai ........................ G06Q 40/12

OTHER PUBLICATIONS

Synechron "USE CASE Automated Data Extraction", Mar. 27, 2017 (Year: 2017) (Year: 2017).*
Williams "Fast Fourier Transform in Predicting Financial Securities Prices" University of Utah, May 3, 2016 (Year: 2016).*

* cited by examiner

FRAMEWORK FOR CASH-FLOW FORECASTING

BACKGROUND

Cash-flow statements generated by online accounting services typically report on the historical cash-flow transactions of a business entity. Consequently, the statements are of limited value in answering pressing questions faced by small businesses in survival mode such as: "How much cash will I have on hand two weeks from now?" "Can I meet payroll?", "How much money is it safe to spend?", or "Will I hit a cash crunch in the next month?".

Some accounting services do attempt to forecast future cash flows. However, the services tend to require users to manually project various incomes and expenses or to define a mathematical form they expect each income or expense to follow. Both approaches are burdensome to the user, expecting them to basically already know the trajectory of their business. Consequently, automated machine- and data-driven cash-flow forecasting remains an area of ongoing research and experimentation.

SUMMARY

In general, in one aspect, the invention relates to a method for cash-flow forecasting. The method includes creating a plurality of event streams associated with a user of an online accounting service. Each event stream includes one or more transactions between a cash account and a non-cash account. The method also includes identifying a first pattern in a first event stream that is a commitment and a second pattern in a second event stream that is a repeated pattern. The method also includes generating a characterization for each of the plurality of event streams based on each identified pattern for the event stream. The method also includes predicting one or more expected cash payments and one or more corresponding expected dates for each of the event streams using the characterization for the event stream and a forecasting model. The forecasting model is trained using a dataset comprising a plurality of other users of the online accounting service. Each of the expected cash payments and each of the expected dates are associated with one or more measures of uncertainty. The method also includes receiving a query related to cash flow through an application program interface (API). The method also includes responding to the query based on the one or more of the expected cash payments, the corresponding expected dates, and the one or more measures of uncertainty, to the query.

In general, in one aspect, the invention relates to a non-transitory computer-readable storage media storing instructions, wherein the instructions, when executed, creates a plurality of event streams associated with a user of an online accounting service, where each event stream includes one or more transactions between a cash account and a non-cash account, identifies a first pattern in a first event stream that is a commitment and a second pattern in a second event stream that is a repeated pattern, generates a characterization for each of the plurality of event streams based on each identified pattern for the event stream, predicts one or more expected cash payments and one or more corresponding expected dates for each of the event streams using the characterization for the event stream and a forecasting model, where the forecasting model is trained using a dataset comprising a plurality of other users of the online accounting service and where each of the expected cash payments and each of the expected dates are associated with one or more measures of uncertainty, receives a query related to cash flow through an application program interface (API), and responds to the query based on the one or more of the expected cash payments, the corresponding expected dates, and the one or more measures of uncertainty, to the query.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Cash flow is critical for many small businesses. Historic cash flow can be understood through reports and other views of historic data. However, many decisions made by small business owners depend on their future cash flow. The embodiments described below accurately forecast future cash flow and answer relevant questions for the small business, using a framework for predicting future cash flow transactions and aggregating these to create a comprehensive cash flow forecast for a small business.

In general, one or more embodiments of the invention involve a framework for forecasting cash flows for the user of an online accounting service (e.g., a massively multi-user online accounting service). In one or more embodiments, the online accounting service creates coherent event streams comprised of transactions between a user's cash accounts and non-cash accounts. Next, a characterization for each of the event streams is generated based on identified patterns, historic cash transactions, and external information, e.g., external information from other event streams (e.g., the expected cash payment for the event stream associated with tax might be a percentage of the expected cash payment from the event stream associated with sales or an event stream associated with deductible expenses), external information regarding the user's transactions with similar event streams (e.g., one or more similar suppliers or one or more similar customers) external information regarding the other users of the online accounting service, external information based on geographic location or jurisdiction, external information based on industry, external information from government records, etc. As used in this disclosure, a "characterization" is defined to mean the attributes of an event stream that are relevant to cash-flow forecasting.

Using the characterization for each event stream, expected cash payments (e.g., in terms of amount) and corresponding expected dates are predicted and uncertainty measures (e.g., from a probability distribution) for both of those expected values are determined. Then, by aggregating the expected cash payments and their corresponding expected dates, queries involving future cash flows are answered. These queries may arise directly from the user or from the accounting system. Variances between the expected values it generates and actual values may then be tracked. And based on those variances, modifications to the framework may be made, such as splitting or combining event streams or changing an algorithm used for prediction (e.g., using the Python scikit-learn package for supervised or unsupervised learning). In one or more embodiments, the variances might be used to perform sensitivity analysis.

Figure 1A:
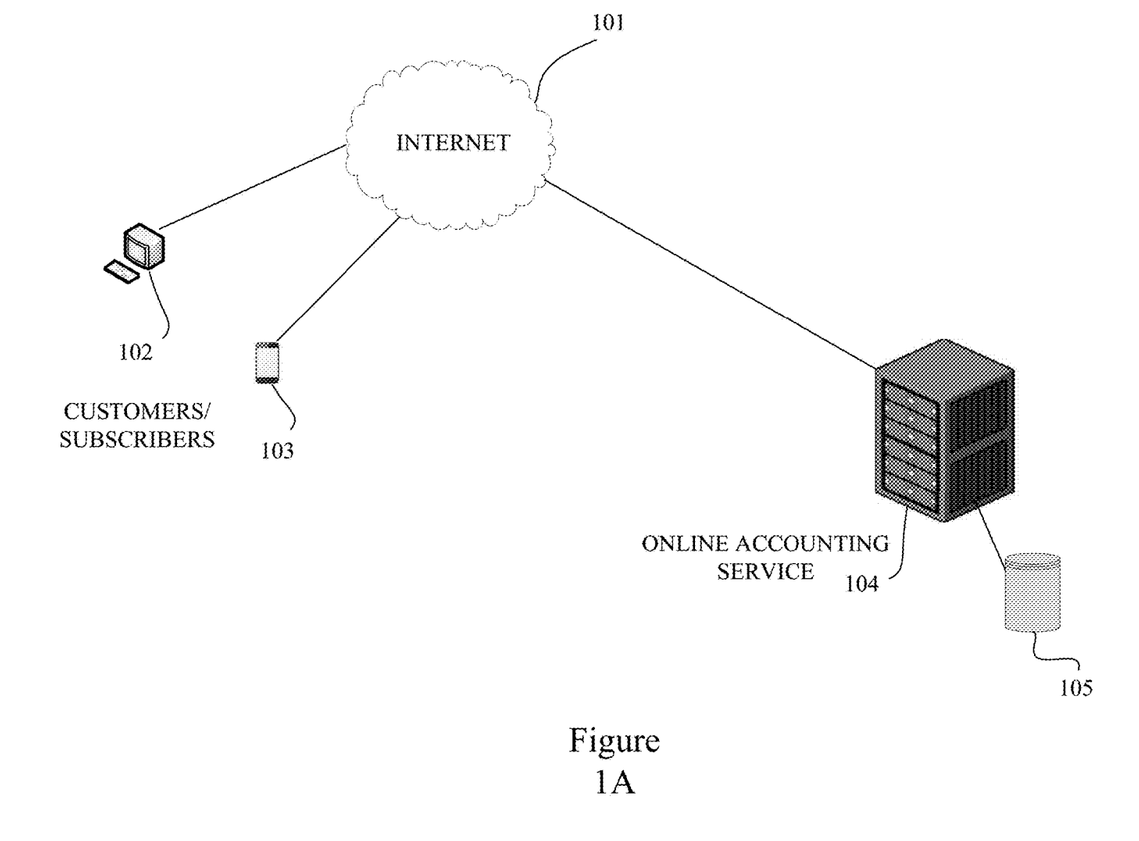
FIG. 1A is a diagram showing a website hosting a multi-user online accounting service, in accordance with one or more embodiments of the invention.

FIG. 1A is a diagram showing a website hosting an online accounting service, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are communicatively coupled by a network 101 (e.g., a wide area network (WAN) including the Internet, which might be wireless in part or in whole) with a website 104 hosting an online accounting service, such as Quick-Books Online (QBO).

In an example embodiment, website 104 might be composed of a number of servers (e.g., racked servers) connected by a network (e.g., a local area network (LAN) or a WAN) to each other in a cluster (e.g., a load-balancing cluster, a Hadoop cluster, a Beowulf cluster, etc.) or other distributed system which might run website software (e.g., web-server software, database software, etc.) and distributed-computing and/or cloud software such as Map-Reduce, Google File System, Amazon Web Services (AWS), Hadoop, Hadoop File System, Hadoop YARN, Hive, Dremel, CloudBase, Memcached, Redis, etc. The servers in website 104 might be connected to persistent storage 105. Persistent storage 105 might include flash memory, a redundant array of independent disks (RAID), and/or a storage area network (SAN). Additionally or alternatively, the servers for website 104 and/or persistent storage 105 might be hosted wholly or partially in a public and/or private cloud, e.g., where the cloud resources serve as a platform-as-a-service (PaaS) or an infrastructure-as-a-service (IaaS).

Persistent storage 105 might be used to store accounting and financial data, including accounting and financial data related to the cash flows of the users of a multi-user online accounting service. Additionally, persistent storage 105 might be used to store data and algorithms related to the cash-flow forecasting framework described in this disclosure. Personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access website 104, e.g., to perform accounting transactions. Additionally or alternatively, users of personal computer 102 and/or mobile device 103 might use other application programs or apps to access website 104.

Figure 1B:
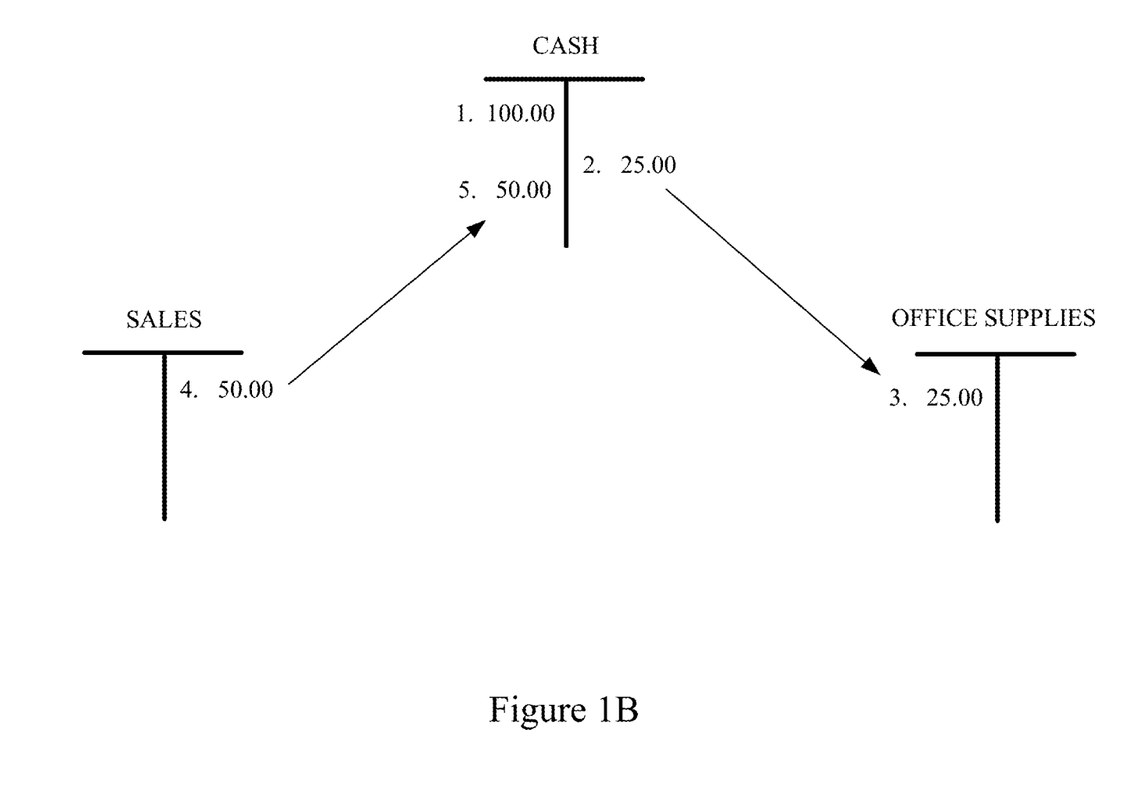
FIG. 1B is a diagram showing event streams related to cash flows, in accordance with one or more embodiments of the invention.

FIG. 1B is a diagram showing event streams related to cash flows, in accordance with one or more embodiments of the invention. As shown in this figure, the balance in the CASH account (1) was initially $100.00. Then $25.00 was transferred from the CASH account (2) to the OFFFICE SUPPLIES account (3). Then later, $50.00 was transferred from the SALES account (4) to the CASH account (5), leaving a balance of $125.00 in that account. Each of these transfers are between a cash account and a non-cash account and therefore meet the definition of an event stream.

Figure 2:
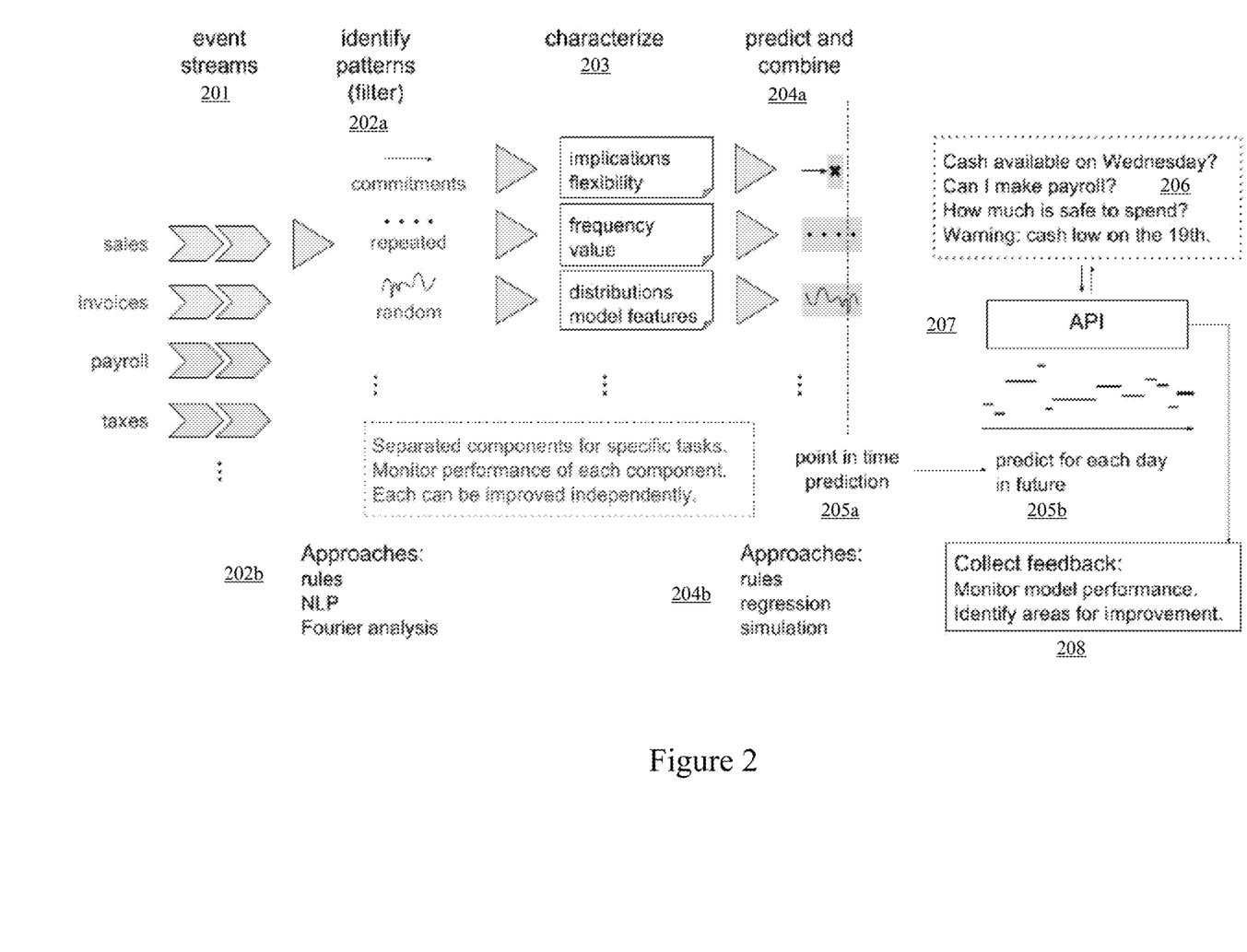
FIG. 2 is a diagram showing the modular and extensible components of a framework for cash-flow forecasting, in accordance with one or more embodiments of the invention.

FIG. 2 is a diagram showing the modular and extensible components of a framework for cash-flow forecasting, in accordance with one or more embodiments of the invention. The components might be software running on servers at a website hosting a multi-user online accounting service, such as website 104. As used in this disclosure, a cash-flow transaction is defined as a transaction involving a cash account and a non-cash account. As used in this disclosure, a "cash account" is broadly defined to mean an account that provides ready access to cash, e.g., a bank account, a debit-card account, un-deposited funds, etc. As used in this disclosure, "non-cash account" is defined to mean all other accounts, e.g., sales, invoices, payroll, taxes, etc. An event stream is one or more cash-flow transactions that form a single group of cohesive transactions which is complete (e.g., no cash transactions in the group are in other event streams) and pure (e.g., no additional cash transactions, not of this group, are in this event stream). It will be appreciated that a transaction between sales (or invoices) and a cash account increases the balance of the cash account, whereas a transaction between a cash account and payroll (or taxes) decreases the balance of the cash account.

As shown in FIG. 2, the first component 201 of the framework generates event streams, e.g., from the accounts in a user's chart of accounts in a general ledger as discussed further below. Next, the second component 202a identifies a pattern in an event stream using, for example, the approaches identified as 202b, e.g., rules, natural language processing (NLP), Fourier analysis, etc. In one or more embodiments, the patterns might include: (1) commitments (e.g., legal obligations) resulting from a contract, a federal, state, or local law or regulation, etc.; (2) repeated patterns resulting from recurring revenues from sales, invoices, etc., and/or recurring expenses for payroll, supply purchases, etc.; and (3) stochastic or random patterns resulting from income and expenses related to the vagaries of day to day business, random events, acts of God or other force majeure, criminal behavior, etc.

In one or more embodiments, commitments are recognized by applying a trained natural language processing (NLP) model (e.g., a multinomial classifier based on logistic regression or naïve Bayes) to text associated with the accounts and transactions in an event stream, including the names of each of the accounts (e.g., an account named "Mortgage") and/or descriptions of the transactions (e.g., a description stating "payment to IRS". The NLP model might be trained on the entire dataset of a multi-user online accounting service, in one or more embodiments. The outputs of the NLP model might become inputs to predefined rules, e.g., decision trees, inference engines, etc.

Also, in one or more embodiments, repeated patterns might be identified in component 202a by the application of Fourier transforms. For example, a Fast Fourier Transform (FFT) might be applied to an event stream and a periodic pattern identified as one or more peaks in the resulting output, e.g., a peak in frequency-space corresponding to a payroll event occurring every two weeks in an event stream for payroll. And in one or more embodiments, component 202a might identify an event stream as a random pattern if, for example, the time series for the event stream exhibits random behavior or anomalous behavior with respect to some measure of location and its associated measure of dispersion. In one or more embodiments, an event stream might be considered to exhibit a random pattern if the event stream is not a commitment and does not exhibit a periodic pattern.

After identification of a pattern in an event stream by component 202a, the pattern is input to component 203, which characterizes the pattern. So, for example, if the pattern is a commitment, component 203 might determine the implications of missing a cash payment, e.g., a penalty and/or interest. Additionally or alternatively, component 203 might determine any flexibility with respect to a cash payment, e.g., whether there is a grace period to make the cash payment or an extension fee that might be paid. If the pattern is a repeated pattern, component 203 might determine a frequency and a value for the pattern, e.g., an average payroll of $225,000 is due approximately every 14 days. If the pattern is a random pattern, component 203 might determine a probability distribution for the pattern based on features (e.g., arising from a user's financial data or from the aggregate financial data of some or all of the users of the accounting service) input to a model (e.g., based on time series modeling, logistic regression, random forests, gradient boosting, etc.) that predicts future transactions and/or identifies rare events or anomalies.

After characterization of a pattern in an event stream by component 203, the characterization is input to component 204a, which predicts cash payments and payment dates and/or and combinations of cash payments and payment dates, e.g., using the approaches identified in 204b. So, for example, if the characterization is for a commitment, component 204a might apply rules, e.g., decision trees, an inference engine, etc., to predict an expected value (e.g., a measure of location) for the amount of a cash payment and an expected value for the date when the cash payment might occur. These expected values are shown as point-in-time predictions 205a. In one or more embodiments, component 204a might also provide a measure of uncertainty (e.g., a measure of dispersion (e.g., a confidence interval, a range, a standard deviation, etc.)) associated with the predicted expected values. In one or more embodiments, the measure of uncertainty for the expected value of the amount of a cash payment might be based on a probability distribution specific to that expected value. And the measure of uncertainty for the expected value for the date might be based on another probability distribution. Alternatively, the expected values for the amount of the cash payment and the date might be based on a joint probability distribution.

For certain types of commitments (e.g., bills, invoices, credit cards, etc.), the framework might additionally create event substreams related to the commitment event stream and use expected values (e.g., for amount and date) for the substreams to better predict the expected values (e.g., for amount, date, carryover amount, etc.) of the commitment stream. In one example, the substreams might be the charges against a credit card, e.g., transactions between a credit card account and expense accounts that are not cash accounts. Each of these substreams of charges might be identified as a commitment itself or as a repeated pattern (using FFT) or random pattern (e.g., using time series models). Then using the corresponding characterization for the identified pattern, the framework might predict expected values (e.g., for amount and date) as well as a measure of uncertainty for each of the substreams during a credit card billing period and combine these predictions and measures of uncertainty to predict the expected values (e.g., for amount, date, carryover amount, etc.) and associated measures of uncertainty for the credit card commitment at the end of the credit card billing period.

If the characterization is for a repeated pattern, component 204a might use regression (e.g., logistic, linear, nonlinear, etc.) or time-series model (e.g., ARIMA, exponential smoothing, recurrent neural networks, deep-learning time series, etc.) to predict an expected value for the amount of a cash payment and an expected value for the date when the cash payment might occur and might also provide a measure of uncertainty (e.g., a confidence interval, a range, a standard deviation, etc.) associated with the predicted expected values. Alternatively, the expected date or dates for a set of payments might be predicted as a continuation of the historically observed repeated pattern. And, if the characterization is for a random pattern, component 204a might use a time-series model (e.g., ARIMA, exponential smoothing, recurrent neural networks, deep-learning time series, etc.) or a simulation (e.g., a Monte Carlo simulation) to predict an expected value for the amount of a cash payment and an expected value for the date when the cash payment might occur and might also provide a measure of uncertainty associated with the predicted expected values (e.g., a confidence interval, a range, a standard deviation, etc.). Here again, these expected values are shown as point-in-time prediction 205a. And the measure of uncertainty for the expected value of the amount of a cash payment might be based on a probability distribution specific to that expected value. And the measure of uncertainty for the expected value for the date might be based on another probability distribution. Alternatively, the expected values for the amount of the cash payment and the date might be based on a joint probability distribution.

Following prediction of the point-in-time predictions 205a, component 204a might combine some or all of the point-in-time predictions 205a and their measures of uncertainty (e.g., by summing up the point-in-time predictions and aggregating their measures of uncertainty), resulting in predictions such as combined prediction 205b, which might be associated with its own measure of uncertainty (e.g., a confidence interval, a range, a standard deviation, a probability distribution, etc.). In one or more embodiments, the point-in-time predictions 205a and/or the combined prediction 205b is generated in real-time or near real-time in response to a query from a user, e.g., one of the example queries 206, which might be received through application programming interface (API) 207 from e.g., a command line interface (CLI), a graphical user interface (GUI), a conversational interface, etc. In one or more embodiments, the query might originate with the multi-user online accounting service itself. It will be appreciated that a script or an application program (or app) might use the CLI to communicate with the framework in one or more embodiments. After responding to the query (e.g., using the CLI, the GUI, the conversational interface, etc.) with point-in-time predictions 205*a* and/or the combined prediction 205*b*, component 208 might monitor the framework's performance by calculating variances between the expected values in the point-in-time predictions 205*a* and/or the combined/aggregated prediction 205*b* and actual values observed at later points in time. It will be appreciated that similar variances might be calculated using historical data, e.g., by inputting data from one year ago and comparing the resulting expected values with the actual results that have occurred. Then, based on the variances, whether based on monitoring or derived from historical values, the framework might make a remedial or prophylactic adjustment, e.g., combine two or more event streams or split one event stream into two or more event streams or change an algorithm used for supervised or unsupervised learning (e.g., in scikit-learn).

Figure 3:
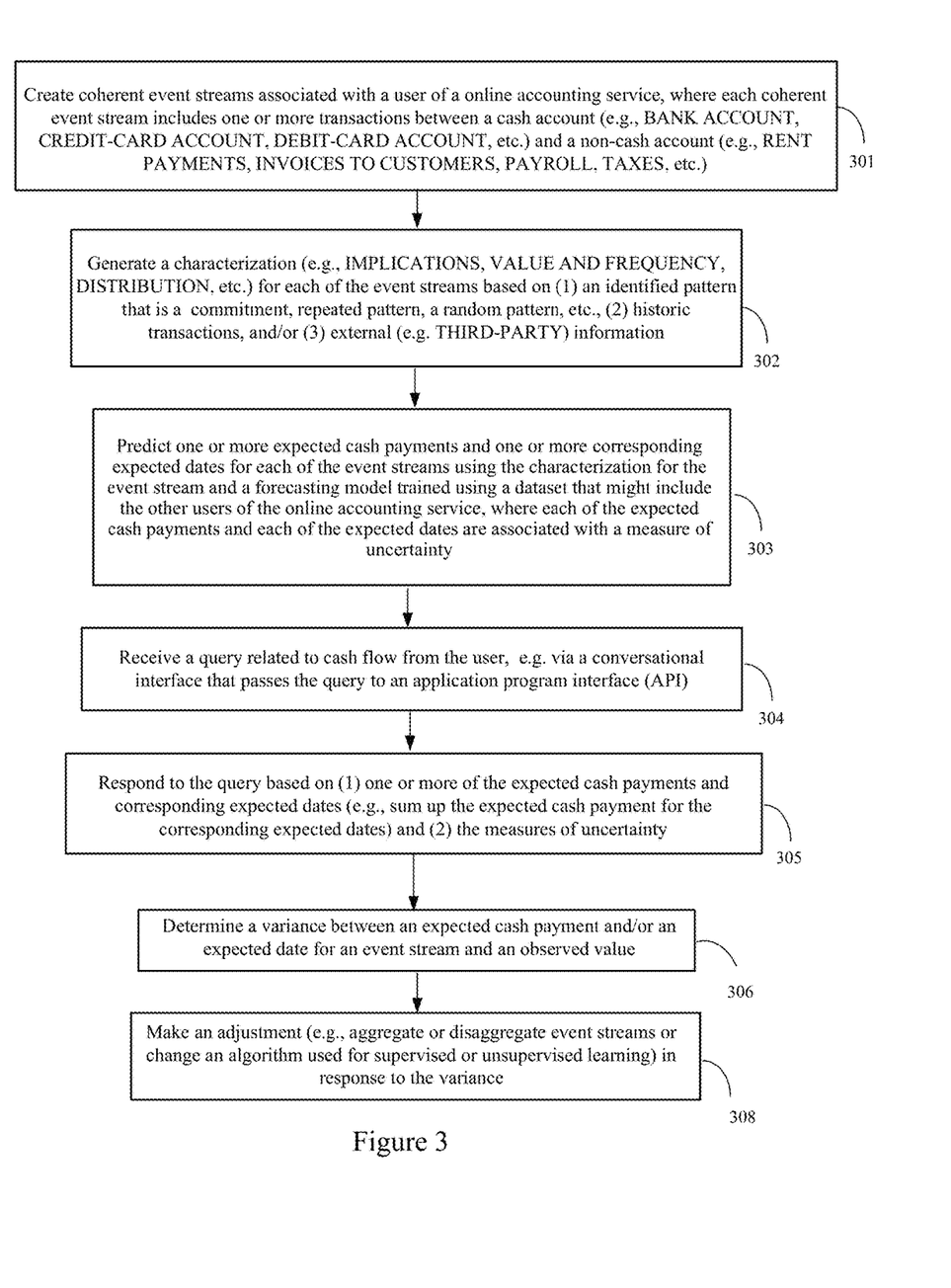
FIG. 3 is a flowchart diagram of a process for predicting expected values related to cash flow and for adjusting a cash-flow forecasting framework based on a variance, in accordance with one or more embodiments of the invention.

FIG. 3 is a flowchart diagram of a process for predicting expected values related to cash flow and for adjusting a cash-flow forecasting framework based on a variance, in accordance with one or more embodiments of the invention. In one or more embodiments, the operations shown in this figure are performed by software running on servers at website 104 using persistent storage 105.

In one or more embodiments, one or more of the operations shown in FIG. 3 might be performed on clustered computers running distributed-computing software that supports batch processing based on a Map-Reduce architecture (e.g., Hadoop, Spark). In one or more embodiments, one or more of the operations shown in FIG. 3 are performed on clustered computers running distributed-computing software that supports stream processing based on a Map-Reduce architecture (e.g., Hadoop YARN, Spark streaming). In one or more embodiments, some of the operations shown in FIG. 3 are performed by software (e.g., a client application including, for example, a webpage with embedded JavaScript or ActionScript) running on a client device (e.g., personal computer 102 or mobile device 103).

As depicted in FIG. 3, coherent event streams associated with a user of a multi-user online accounting service are created, in operation 301. Each coherent event stream includes one or more transactions between a cash account (e.g., bank account, credit-card account, debit-card account, etc.) and a non-cash account (e.g., rent payments, invoices to customers, payroll, taxes, etc.). In operation 302, a characterization (e.g., implications, value and frequency, distribution, etc.) is generated for each of the event streams based on (1) an identified pattern that is a commitment, repeated pattern, a random pattern, etc., (2) historic cash transactions, and/or (3) external information, e.g., external information from other event streams, external information regarding the other users of the online accounting service, external information based on geographic location, external information based on industry, external information from government records, etc. In operation 303, one or more expected cash payments and one or more corresponding expected dates are predicted for each of the event streams using the characterization for the event stream and a forecasting model that is trained using a dataset that might include the other users of the online accounting service. Each of the expected cash payments and each of the expected dates are associated with a measure of uncertainty, as discussed above.

In operation 304, a query related to cash flow from the user is received, e.g., through a CLI, GUI, conversational interface, etc., that passes the query through an API. And in operation 305, a response to the query is based on (1) one or more of the expected cash payments and corresponding expected dates (e.g., either as point-in-time predictions or combined predictions) and (2) the measures of uncertainty.

In one or more embodiments, the software performing the operations described above might use ranges to present the measures of uncertainty to the user when responding to the query. Additionally or alternatively, the software might use confidence intervals or probabilities expressed as percentages or decimals between 0.0 and 1.0. Further, the software might use a measure of dispersion such as a standard deviation to present the measures of uncertainty to the user when responding to the query. And in one or more embodiments, the software might use graphical methods to present the measures of uncertainty to the user, e.g., a line graph with surrounding shaded regions representing potential values in a min-max range.

As depicted in FIG. 3, a variance is determined between an expected cash payment and/or an expected date for an event stream and an observed value, in operation 306. For example, the software performing the operation might predict that the expected value for phone service on Apr. 15, 2017, is $13,700.00, but the actual value paid is $16,450.00. The variance in this example is $2,750.00. Then in operation 308, a remedial or prophylactic adjustment is performed (e.g., aggregate or disaggregate event streams) in response to the variance. For example, the software might disaggregate phone service into phone service for a first line and phone service for a second line in order to improve the predictions of the forecasting framework.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In one or more embodiments, the operations shown in FIG. 3 might be performed by software running on servers at website 104 using persistent storage 105. In one or more embodiments, one or more of the operations shown in FIG. 3 might be performed on clustered computers running distributed-computing software that supports batch processing based on a Map-Reduce architecture. In one or more embodiments, one or more of the operations shown in FIG. 3 might be performed on clustered computers running distributed-computing software that supports stream processing based on a Map-Reduce architecture. In one or more embodiments, some of the operations shown in FIG. 3 might be performed by software (e.g., a client application including, for example, a webpage with embedded JavaScript or ActionScript) running on a client device (e.g., personal computer 102 or mobile device 103).

Figure 4:
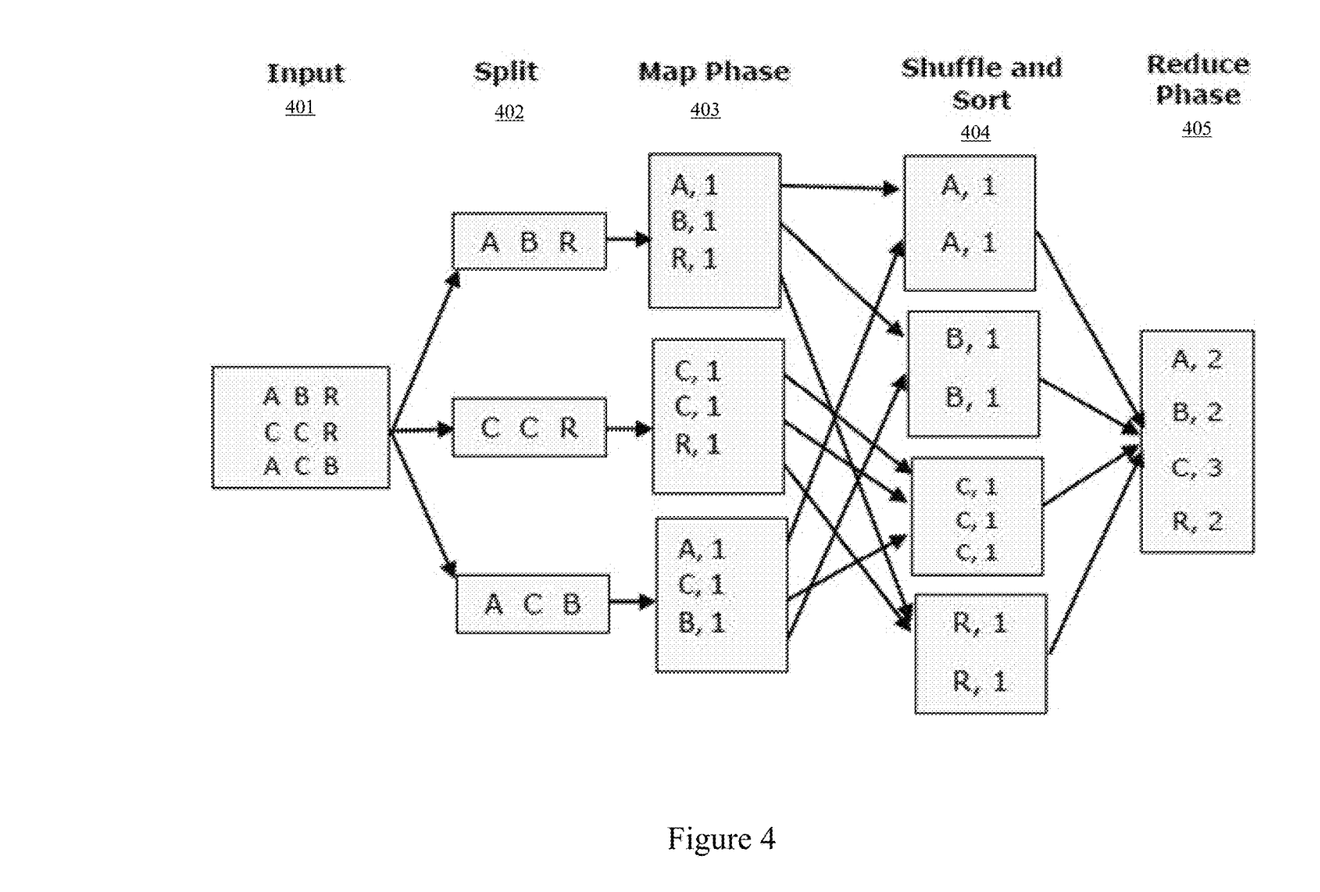
FIG. 4 is a diagram showing a Map-Reduce architecture, in accordance with one or more embodiments of the invention.

FIG. 4 is a diagram showing a Map-Reduce architecture, in accordance with one or more embodiments. As discussed above, such an architecture might be used by the cash-flow forecasting framework in one or more embodiments, e.g., to perform NLP and/or training an NLP model with labeled data. Though the following example is simplified, it illuminates the separate phases that might occur in such an architecture.

It will be appreciated that the phases in FIG. 4 show sorting and counting the characters in three three-letter strings, namely, ABR, CCR, and ACB. As shown in this figure, three character strings are initially on one server in the Input phase 401. In the Split phase 402, the three characters strings are transferred to three different servers, where in the Map Phase 403, each character in each string is associated with a value of 1. In the Shuffle and Sort phase 404, characters which are the same are transferred to separate servers, along with their associated values of 1. Then, in the Reduce phase 405, the associated values are summed, resulting in 2 A's, 2 B's, 3 C's, and 2 R's.

The following use cases are for explanatory purposes only and not intended to limit the scope of the invention.

In a first use case, a small business owner opens an application ("app") on his/her smartphone and uses a conversational interface provided by the app to ask: "Can I make my loan payment?" The app transmits the question to the cash-flow forecasting framework which identifies the loan payment as a commitment, characterizes the commitment by determining any penalty, interest, and grace period, makes a point-in-time prediction as to the payment amount and the date (e.g., the date on which the grace period expires) and determines a measure of uncertainty (e.g., a 5% chance of error). The framework also compares the payment amount against the expected balances in the small business owner's cash accounts on the date, where the expected balances might have been determined in an earlier pass through the cash-flow forecasting framework. If the payment amount is lower than the expected balances on the expected date, the cash-flow forecasting framework causes the conversational interface to reply: "Yes, on the last day of the grace period."

In a second use case, a small business owner opens an app on his/her smartphone and uses a conversational interface provided by the app to ask: "Can I meet payroll this week?" The app transmits the question to the cash-flow forecasting framework which identifies payroll as a repeating pattern, characterizes the repeating pattern using a payment and a date, makes a point-in-time prediction as to the expected payment amount and the expected date and determines a measure of uncertainty (e.g., a 30% chance of error). Next the forecasting framework compares that expected payment amount against the expected balances in the small business owner's cash accounts on the expected date, where the expected balances might have been determined in an earlier pass through the cash-flow forecasting framework. If the expected payment amount is lower than the expected balances on the expected date, the cash-flow forecasting framework causes the conversational interface to reply: "Yes, but there is a 30% chance that you won't."

In a third use case, a small business owner opens an app on his/her smartphone and uses a conversational interface provided by the app to ask: "If my store is flooded this winter, how much is it going to cost me?" The app transmits the question to the cash-flow forecasting framework which identifies flooding as a random or anomalous event, characterizes it using a probability distribution, makes a point-in-time prediction as to the amount of the loss (e.g., $86,000.00) and the date on which the loss might occur and determines a measure of uncertainty (e.g., a potential range of $67,000.00 to $112,000.00 for the loss). The cash-flow forecasting framework then causes the conversational interface to reply: "Eighty-six thousand dollars. But possibly as low as sixty-seven or as high as one hundred and twelve thousand dollars."

Figure 5:
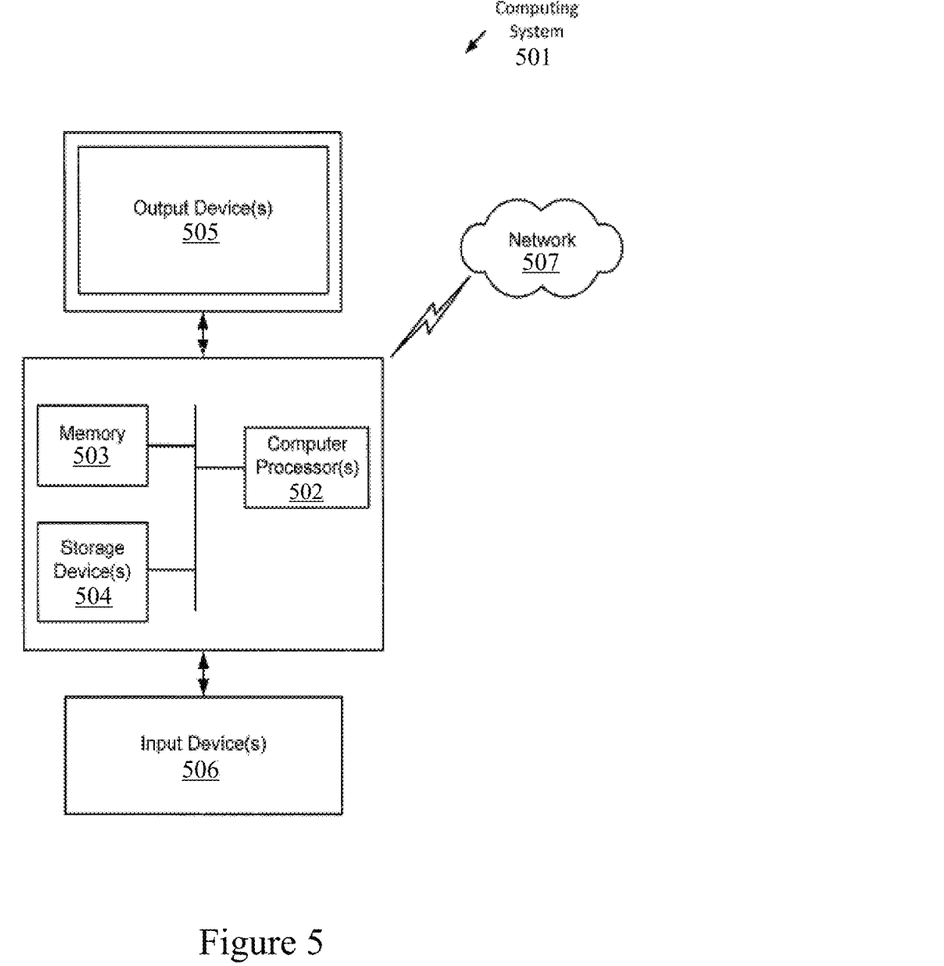
FIG. 5 is a diagram showing a computing system, in accordance with one or more embodiments of the invention.

Embodiments of the invention may be implemented on a computing system. Any combination of mobile, desktop, server, embedded, or other types of hardware may be used. For example, as shown in FIG. 5, the computing system (501) may include one or more computer processor(s) (502), associated memory (503) (e.g., random access memory (RAM), cache memory, flash memory, etc.), one or more storage device(s) (504) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (501) may also include one or more input device(s) (506), such as a touchscreen, keyboard, mouse, microphone, touchpad, electronic pen, or any other type of input device. Further, the computing system (501) may include one or more output device(s) (505), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (501) may be connected to a network (507) (e.g., a local area network (LAN), a wide area network (WAN) such as the Internet, mobile network, or any other type of network) via a network interface connection (not shown). The input and output device(s) may be locally or remotely (e.g., via the network (507)) connected to the computer processor(s) (502), memory (503), and storage device(s) (504). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (501) may be located at a remote location and connected to the other elements over a network (507). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Although example embodiments of the inventions have been described in some detail for purposes of clarity of understanding, it will be apparent that certain changes and modifications can be practiced within the scope of the following claims. For example, income accounts might take the place of cash accounts in the forecasting framework, where income is defined to mean gross income or net income as those terms are used financial and/or tax accounting. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure. Accordingly, the scope of the invention should be limited only by the attached claims.

What is claimed is:

1. A method, comprising:
    creating a plurality of event streams associated with a user of an online accounting service, wherein each event stream in the plurality of event streams includes one or more transactions between a cash account and a non-cash account,
    identifying a first pattern in a first event stream of the plurality of event streams that is a commitment and a second pattern in a second event stream of the plurality of event streams that is a repeated pattern,
        wherein the plurality of event streams each comprise one or more cash-flow transactions that form a single group of cohesive transactions with respect to two or more types of accounts in the online accounting service, including at least the cash account and the non-cash account,
        wherein the commitment comprises a legal obligation stored as natural language text recognizable by a natural language processing model;
    generating a characterization for each of the plurality of event streams based on each identified pattern for the plurality of event streams, wherein the characterization comprises machine-readable attributes of the plurality of event streams;
    predicting one or more expected cash payments and one or more corresponding expected dates for each of the plurality of event streams using the characterization for the plurality of event streams and a forecasting learning model,
        wherein the forecasting learning model is trained using a dataset comprising a plurality of other users of the online accounting service, and
        wherein each of the expected cash payments and each of the expected dates are associated with one or more measures of uncertainty comprising a first measure of dispersion associated with a first predicted expected value of the one or more expected cash payments and a second measure of dispersion associated with a second predicted expected value of the one or more corresponding expected dates;
    receiving a query related to cash flow through an application program interface (API);
    responding to the query based on the one or more of the expected cash payments predicted by the forecasting learning model, the corresponding expected dates predicted by the forecasting learning model, and the one or more measures of uncertainty,
        wherein responding to the query comprises comparing the one or more expected cash payments and the first measure of dispersion to the one or more corresponding expected dates and the second measure of dispersion, to form a comparison; and
    reporting the comparison to a user device.

2. The method of claim 1, further comprising an operation of identifying a third pattern in a third event stream of the plurality of event streams that is a random pattern.

3. The method of claim 1, wherein the commitment is identified using rules and a natural language processing (NLP) model that is trained using a dataset that includes a plurality of the other users of the online accounting service, wherein the NLP model comprises a multinomial classifier based on logistic regression or naïve Bayes.

4. The method of claim 1, wherein the repeated pattern is identified through use of a fast Fourier transform (FFT).

5. The method of claim 1, wherein each of the operations is performed on clustered computers running distributed-computing software that supports batch processing based on a Map-Reduce architecture.

6. The method of claim 1, wherein each of the operations is performed on clustered computers running distributed-computing software that supports stream processing based on a Map-Reduce architecture.

7. The method of claim 1, wherein the query is received from the user through a conversational interface that passes the query to the API.

8. The method of claim 1, further comprising operations of:
    determining a variance between at least one expected cash payment for an event stream of the plurality of event streams and an actual cash payment for the event stream; and
    making an adjustment to the forecasting learning model in response to the variance.

9. The method of claim 1, wherein at least one expected cash payment for at least one event stream of the plurality of event streams is based on an expected cash payment for another event stream of the plurality of event streams.

10. The method of claim 9, wherein the expected cash payment for the event stream associated with tax is based on the expected cash payment from the event stream associated with sales.

11. A non-transitory computer-readable storage media storing instructions, wherein the instructions, when executed, performs the following operations:
    creating a plurality of event streams associated with a user of an online accounting service, wherein each event stream in the plurality of event streams includes one or more transactions between a cash account and a non-cash account;
    identifying a first pattern in a first event stream of the plurality of event streams that is a commitment and a second pattern in a second event stream of the plurality of event streams that is a repeated pattern,
        wherein the plurality of event streams each comprise one or more cash-flow transactions that form a single group of cohesive transactions with respect to two or more types of accounts in the online accounting service, including at least the cash account and the non-cash account,
        wherein the commitment comprises a legal obligation stored as natural language text recognizable by a natural language processing model;
    generating a characterization for each of the plurality of event streams based on each identified pattern for the plurality of event streams, wherein the characterization comprises machine-readable attributes of the plurality of event streams;

predicting one or more expected cash payments and one or more corresponding expected dates for each of the plurality of event streams using the characterization for the plurality of event streams and a forecasting learning model, wherein the forecasting learning model is trained using a dataset comprising a plurality of other users of the online accounting service, and wherein each of the expected cash payments and each of the expected dates are associated with one or more measures of uncertainty comprising a first measure of dispersion associated with a first predicted expected value of the one or more expected cash payments and a second measure of dispersion associated with a second predicted expected value of the one or more corresponding expected dates;

receiving a query related to cash flow through an application program interface (API);

responding to the query based on the one or more of the expected cash payments predicted by the forecasting learning model, the corresponding expected dates predicted by the forecasting learning model, and the one or more measures of uncertainty, wherein responding to the query comprises comparing the one or more expected cash payments and the first measure of dispersion to the one or more corresponding expected dates and the second measure of dispersion, to form a comparison; and reporting the comparison to a user device.

12. The non-transitory computer-readable storage media of claim 11, further comprising an operation of identifying a third pattern in a third event stream of the plurality of event streams that is a random pattern.

13. The non-transitory computer-readable storage media of claim 11 wherein the commitment is identified using rules and a natural language processing (NLP) model that is trained using a dataset that includes a plurality of the other users of the online accounting service, wherein the NLP model comprises a multinomial classifier based on logistic regression or naïve Bayes.

14. The non-transitory computer-readable storage media of claim 11, wherein the repeated pattern is identified through use of a fast Fourier transform (FFT).

15. The non-transitory computer-readable storage media of claim 11, wherein the query is received from the user through a conversational interface that passes the query to the API.

16. The non-transitory computer-readable storage media of claim 11, further comprising operations of:
determining a variance between at least one expected cash payment for an event stream of the plurality of event streams and an actual cash payment for the event stream; and
making an adjustment to the forecasting learning model in response to the variance.

17. The non-transitory computer-readable storage media of claim 11, wherein at least one expected cash payment for at least one event stream of the plurality of event streams is based on an expected cash payment for another event stream of the plurality of event streams.

18. The non-transitory computer-readable storage media of claim 17, wherein the expected cash payment for the event stream associated with tax is based on the expected cash payment from the event stream associated with sales.

19. The non-transitory computer-readable storage media of claim 11, wherein each of the operations is performed on clustered computers running distributed-computing software that supports batch processing based on a Map-Reduce architecture.

20. The non-transitory computer-readable storage media of claim 11, wherein each of the operations is performed on clustered computers running distributed-computing software that supports stream processing based on a Map-Reduce architecture.

21. A method, comprising:
creating a plurality of event streams associated with a user of an online accounting service, wherein each event stream in the plurality of event streams includes one or more transactions between a cash account and a non-cash account, identifying a first pattern in a first event stream of the plurality of event streams that is a commitment and a second pattern in a second event stream of the plurality of event streams that is a repeated pattern, wherein the plurality of event streams each comprise one or more cash-flow transactions that form a single group of cohesive transactions with respect to two or more types of accounts in the online accounting service, including at least the cash account and the non-cash account, wherein the commitment comprises a legal obligation stored as natural language text recognizable by a natural language processing model;

wherein the commitment is identified using rules and a natural language processing (NLP) model that is trained using a dataset that includes a plurality of the other users of the online accounting service, wherein the NLP model comprises a multinomial classifier based on logistic regression or naïve Bayes; and wherein the repeated pattern is identified through use of a fast Fourier transform (FFT);

generating a characterization for each of the plurality of event streams based on each identified pattern for the plurality of event streams, wherein the characterization comprises machine-readable attributes of the plurality of event streams;

predicting one or more expected cash payments and one or more corresponding expected dates for each of the plurality of event streams using the characterization for the plurality of event streams and a forecasting learning model, wherein the forecasting learning model is trained using a dataset comprising a plurality of other users of the online accounting service, and wherein each of the expected cash payments and each of the expected dates are associated with one or more measures of uncertainty comprising a first measure of dispersion associated with a first predicted expected value of the one or more expected cash payments and a second measure of dispersion associated with a second predicted expected value of the one or more corresponding expected dates;

receiving a query related to cash flow through an application program interface (API);

responding to the query based on the one or more of the expected cash payments predicted by the forecasting learning model, the corresponding expected dates predicted by the forecasting learning model, and the one or more measures of uncertainty, wherein responding to the query comprises comparing the one or more expected cash payments and the first measure of dispersion to the one or more corresponding expected dates and the second measure of dispersion, to form a comparison; and reporting the comparison to a user device.

* * * * *

UNITED STATES PATENT AND TRADEMARK OFFICE
CERTIFICATE OF CORRECTION

PATENT NO. : 10,489,865 B1
APPLICATION NO. : 15/473535
DATED : November 26, 2019
INVENTOR(S) : Colin Dillard et al.

Page 1 of 1

It is certified that error appears in the above-identified patent and that said Letters Patent is hereby corrected as shown below:

On the Title Page

Item (56) References Cited, occurring in the fourth reference cited under U.S. PATENT DOCUMENTS, "G06O 40/02" should read -- G06Q 40/02 --.

Item (56) References Cited, occurring in the fifth reference cited under U.S. PATENT DOCUMENTS, "G06O 20/207" should read -- G06Q 20/207 --.

Signed and Sealed this
Tenth Day of March, 2020

Andrei Iancu
*Director of the United States Patent and Trademark Office*